(12) United States Patent
Byun et al.

(10) Patent No.: US 11,880,017 B2
(45) Date of Patent: Jan. 23, 2024

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); Inyoung Song, Daejeon (KR); Dong Hyun Kim, Daejeon (KR); Kwangseok Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 586 days.

(21) Appl. No.: 16/756,333

(22) PCT Filed: Feb. 12, 2019

(86) PCT No.: PCT/KR2019/001695
§ 371 (c)(1),
(2) Date: Apr. 15, 2020

(87) PCT Pub. No.: WO2019/177271
PCT Pub. Date: Sep. 19, 2019

(65) Prior Publication Data
US 2020/0241173 A1   Jul. 30, 2020

(30) Foreign Application Priority Data
Mar. 16, 2018 (KR) .................. 10-2018-0030717

(51) Int. Cl.
*G02B 1/115* (2015.01)
*G02B 1/14* (2015.01)
*G02B 1/08* (2006.01)
*G02B 5/30* (2006.01)
*G02F 1/1335* (2006.01)
*G02B 1/11* (2015.01)

(52) U.S. Cl.
CPC .............. *G02B 1/115* (2013.01); *G02B 1/08* (2013.01); *G02B 1/11* (2013.01); *G02B 1/14* (2015.01); *G02B 5/3033* (2013.01); *G02F 1/133541* (2021.01); *C09K 2323/03* (2020.08)

(58) Field of Classification Search
CPC ... G02B 1/08; G02B 1/11; G02B 1/14; G02B 1/115; G02B 5/3033; G02B 5/305; G02B 5/16; G02F 1/133541; B32B 5/16; B32B 7/02; C09K 2323/03
See application file for complete search history.

(56) References Cited

U.S. PATENT DOCUMENTS

| | | | |
|---|---|---|---|
| 8,691,351 B2 | 4/2014 | Asakura et al. | |
| 2010/0189971 A1 | 1/2010 | Isono et al. | |
| 2010/0196687 A1 | 8/2010 | Isono et al. | |
| 2010/0271699 A1 | 10/2010 | Chang et al. | |
| 2010/0297433 A1 | 11/2010 | Kourtakis et al. | |
| 2012/0200933 A1* | 8/2012 | Akiyama | G02B 5/0247 359/601 |
| 2013/0143028 A1* | 6/2013 | Asahi | G02B 1/113 428/336 |
| 2013/0215514 A1 | 8/2013 | Kim et al. | |
| 2013/0216818 A1 | 8/2013 | Kim et al. | |
| 2016/0018578 A1* | 1/2016 | Yonemoto | G02B 1/14 156/60 |
| 2016/0187540 A2 | 6/2016 | Akutagawa et al. | |
| 2018/0017713 A1 | 1/2018 | Byun et al. | |
| 2018/0106929 A1 | 4/2018 | Song et al. | |
| 2018/0231687 A1 | 8/2018 | Byun et al. | |
| 2019/0025467 A1 | 1/2019 | Byun et al. | |
| 2019/0137658 A1 | 5/2019 | Song et al. | |
| 2019/0137659 A1 | 5/2019 | Song et al. | |

FOREIGN PATENT DOCUMENTS

| | | | | |
|---|---|---|---|---|
| CN | 1908700 A | 2/2007 | | |
| CN | 101285898 A | 10/2008 | | |
| CN | 107003562 A | 8/2017 | | |
| CN | 107632330 A | 1/2018 | | |
| CN | 107635765 A | 1/2018 | | |
| CN | 207601348 U | 7/2018 | | |
| CN | 111133345 B | * | 2/2022 | B32B 27/14 |
| EP | 3287817 A1 | 2/2018 | | |
| JP | 2003-075603 A | 3/2003 | | |
| JP | 2005-338165 A | 12/2005 | | |
| JP | 2007-272131 A | 10/2007 | | |
| JP | 2009-217258 A | 9/2009 | | |
| JP | 2009-276738 A | 11/2009 | | |
| JP | 2011-511304 A | 4/2011 | | |
| JP | 2011-088787 A | 5/2011 | | |
| JP | 2011-133867 A | 7/2011 | | |
| JP | 2012-008158 A | 1/2012 | | |
| JP | 2012-234170 A | 11/2012 | | |
| JP | 2014-006447 A | 1/2014 | | |
| JP | 2014-102377 A | 6/2014 | | |
| JP | 2014-525600 A | 9/2014 | | |
| JP | 2014-529762 A | 11/2014 | | |
| JP | 2015-108862 A | 6/2015 | | |
| JP | 2016-218395 A | 12/2016 | | |

(Continued)

OTHER PUBLICATIONS

International Search Report issued for International Application No. PCT/KR2019/001695 dated Jun. 7, 2019, 4 pages.

*Primary Examiner* — Sophie Hon
(74) *Attorney, Agent, or Firm* — ROTHWELL, FIGG, ERNST & MANBECK, P.C.

(57) ABSTRACT

The present invention relates to anti-reflective films including: a light-transmitting substrate; a hard coating layer; and a low refractive layer, wherein the low refractive layer includes a first region including a binder resin and high refractive inorganic nanoparticles and a second region including a binder resin and low refractive inorganic nanoparticles, and when polarization ellipticity measured by ellipsometry is fitted to a Cauchy model for each of the first region and the second region, predetermined requirements are fulfilled.

20 Claims, No Drawings

(56) References Cited

FOREIGN PATENT DOCUMENTS

| | | | |
|---|---|---|---|
| JP | 2018-533068 A | 11/2018 | |
| JP | 2019-508753 A | 3/2019 | |
| JP | 7102019 B2 * | 7/2022 | ............. B32B 27/14 |
| KR | 10-2009-0049518 A | 5/2009 | |
| KR | 10-2009-0105545 A | 10/2009 | |
| KR | 10-2010-0039869 A | 4/2010 | |
| KR | 10-2017-0086477 A | 7/2017 | |
| KR | 10-2017-0106226 A | 9/2017 | |
| KR | 10-2017-0129669 A | 11/2017 | |
| KR | 10-2018-0008261 A | 1/2018 | |
| KR | 102196429 B1 * | 12/2020 | ............. B32B 27/14 |
| TW | 201621422 A | 6/2016 | |
| TW | 201811936 A | 4/2018 | |
| WO | 2016-084729 A | 6/2016 | |
| WO | 2018-012802 A1 | 1/2018 | |

* cited by examiner

ANTI-REFLECTIVE FILM, POLARIZING PLATE, AND DISPLAY APPARATUS

FIELD OF THE INVENTION

Cross-Reference to Related Application(s)

This application is a 35 U.S.C. § 371 National Phase Entry Application from PCT/KR2019/001695, filed on Feb. 12, 2019, and designating the United States, which claims the benefit of Korean Patent Application No. 10-2018-0030717 filed on Mar. 16, 2018 with the Korean Intellectual Property Office, the disclosures of which are herein incorporated by reference in their entirety.

The present invention relates to an anti-reflective film, a polarizing plate, and a display apparatus.

BACKGROUND OF THE INVENTION

In general, in flat panel display devices such as a PDP, an LCD, etc., an anti-reflective film is installed so as to minimize reflection of incident light from the outside.

Methods for minimizing the reflection of light include: a method of dispersing filler such as inorganic fine particles, etc. in a resin, coating it on a substrate film, and forming unevenness (anti-glare: AG coating); a method of using light interference by forming multiple layers having different refractive indexes on a substrate film (anti-reflective; AR coating); a method of using them together, etc.

Among them, in the case of the AG coating, although the absolute amount of reflected light is equivalent to common hard coatings, a low reflection effect can be obtained by reducing the amount of light entering the eyes using light scattering through unevenness. However, since the AG coating has lowered screen sharpness due to the surface unevenness, recently, many studies have been undertaken on AR coatings.

As films using the AR coating, those having a multi-layered structure in which a hard coating layer (high refractive index layer), a low reflective coating layer, etc. are stacked on a substrate film are being commercialized. However, since the method of forming multiple layers separately conducts the processes of forming each layer, it has disadvantages in that scratch resistance is lowered due to weak interlayer adhesion (interface adhesion) and production cost increases due to repeated processes.

Further, previously, in order to improve scratch resistance of the low refractive layer included in the anti-reflective film, a method of adding various particles of a nanometer size (for example, silica, alumina, zeolite, etc.) was mainly attempted. However, when nanometer-sized particles are used, it is difficult to simultaneously increase scratch resistance while lowering the reflectance of the low refractive layer, and due to the nanometer-sized particles, the anti-fouling property of the surface of the low refractive layer is significantly deteriorated.

Accordingly, in order to reduce the absolute reflection amount of incident light from the outside and improve the anti-fouling property as well as scratch resistance of the surface, many studies are being undertaken, but the resulting property improvement degree is unsatisfactory.

SUMMARY OF THE INVENTION

The present invention provides an anti-reflective film that has high light transmittance, high scratch resistance, and anti-fouling properties, and simultaneously realizes low reflectance, and thus, can increase screen sharpness of a display apparatus.

The present invention also provides a polarizing plate having high sharpness and excellent durability, by including the above anti-reflective film that realizes low reflectance.

The present invention further provides a display apparatus that includes the above anti-reflective film and provides high screen sharpness.

An antireflective film is provided herein, which includes: a light transmitting substrate; a hard coating layer formed on the light transmitting substrate; and a low refractive layer formed on the hard coating layer, wherein the low refractive layer includes a first region including binder resin and high refractive inorganic nanoparticles and having a refractive index of 1.55 or more at a wavelength of 550 nm, and a second region including a binder resin and low refractive inorganic nanoparticles and having a refractive index of 1.45 or less at a wavelength of 550 nm, and when polarization ellipticity measured by ellipsometry is fitted to a Cauchy model of the following Equation 1 for each of the first region and the second region included in the low refractive layer, a difference between the A value of the first region and the A value of the second region is 0.200 or more.

$$n(\lambda) = A + \frac{B}{\lambda^2} + \frac{C}{\lambda^4} \qquad \text{[Equation 1]}$$

In Equation 1, n(λ) is a refractive index at a λ wavelength, λ is a range of 300 nm to 1800 nm, and A, B, and C are Cauchy parameters.

An anti-reflective film is also provided herein, which includes: a light transmitting substrate; a hard coating layer formed on the light transmitting substrate; and a low refractive layer formed on the hard coating layer, wherein the low refractive layer includes a first region including a binder resin and high refractive inorganic nanoparticles and having a refractive index of 1.55 or more at a wavelength of 550 nm, and a second region including a binder resin and low refractive inorganic nanoparticles and having a refractive index of 1.45 or less at a wavelength of 550 nm, and when polarization ellipticity measured by ellipsometry is fitted to a Cauchy model of the above Equation 1 for the first region included in the low refractive layer, the requirements that A is 1.50 to 2.00, B is 0 to 0.10, and C is 0 to 0.01 are fulfilled.

A polarizing plate including the above-explained anti-reflective film is also provided herein.

A display apparatus including the above-explained anti-reflective film is also provided herein.

Hereinafter, an anti-reflective film, a polarizing plate, and a display apparatus according to specific embodiments of the invention will be explained in more detail.

As used herein, a photopolymerizable compound commonly designates a compound that causes a polymerization reaction if light, for example, visible ray or ultraviolet rays, is irradiated.

A fluorine-containing compound means a compound including at least one fluorine atom in the compound.

The term (meth)acryl includes both an acryl and a methacryl.

The term (co)polymer includes both a copolymer and a homopolymer.

The term silica hollow particles mean silica particles derived from a silicon compound or an organosilicon compound, wherein an empty space exists on the surface and/or inside of the silica particles.

According to one embodiment of the invention, an antireflective film is provided, which includes: a light transmitting substrate; a hard coating layer formed on the light transmitting substrate; and a low refractive layer formed on the hard coating layer, wherein the low refractive layer includes a first region including a binder resin and high refractive inorganic nanoparticles and having a refractive index of 1.55 or more at a wavelength of 550 nm, and a second region including a binder resin and low refractive inorganic nanoparticles and having a refractive index of 1.45 or less at a wavelength of 550 nm, and when polarization ellipticity measured by ellipsometry is fitted to a Cauchy model of the following Equation 1 for each of the first region and the second region included in the low refractive layer, a difference between the A value of the first region and the A value of the second region is 0.200 or more.

$$n(\lambda) = A + \frac{B}{\lambda^2} + \frac{C}{\lambda^4} \quad [\text{Equation 1}]$$

In Equation 1, n(λ) is a refractive index at a λ wavelength, λ is in a range of 300 nm to 1800 nm, and A, B, and C are Cauchy parameters.

Previously, in order to control the reflectance of an anti-reflective film, one or more kinds of fine particles were added, but there was a limit to decreasing reflectance below a certain level, and there was a problem in that the scratch resistance or anti-fouling property of an anti-reflective film was deteriorated.

Thus, the present inventors progressed studies on an antireflective film, confirmed through experiments that if a low refractive layer included in the anti-reflective film includes a first region and a second region, and when polarization ellipticity measured by ellipsometry is fitted to a Cauchy model of the following Equation 1 for each of the first region and the second region, a difference between the A value of the first region and the A value of the second region is 0.200 or more, the anti-reflective film may have reflectance of a significantly low level and high transmittance, and simultaneously, realize high scratch resistance and anti-fouling property, and completed the present invention.

The Cauchy parameter A relates to a refractive index at a maximum wavelength, and since a difference between the A value of the first region and the A value of the second region is 0.200 or more, 0.200 to 0.500, or 0.200 to 0.400, the anti-reflective film of the above embodiment may maintain optimized refractive index distribution, and simultaneously, realize lower reflectance, and have a structure that is relatively stable against scratches or external pollutants.

More specifically, when polarization ellipticity measured by ellipsometry is fitted to a Cauchy model of the above Equation 1 for the first region included in the low refractive layer, the A of the first region may be 1.50 to 2.00, 1.53 to 1.90, or 1.55 to 1.85.

Further, when polarization ellipticity measured by ellipsometry is fitted to a Cauchy model of the above Equation 1 for the second region included in the low refractive layer, the A of the second region may be 1.0 to 1.40, 1.1 to 1.40, or 1.2 to 1.40.

The polarization ellipticity measured by ellipsometry and related ellipsometry data (ψ, Δ) may be measured by commonly known methods and devices. For example, for the first region and the second region included in the low refractive layer, using a J. A. Woollam Co. M-2000 device, an incidence angle of 70° may be applied and linear polarization may be measured at a wavelength range of 380 nm to 1000 nm. The measured ellipsometry data (ψ, Δ) may be divided into the first region and the second region and applied to a Cauchy model of the above Equation 1 using Complete EASE software, and fitted such that a mean squared error (MSE) may become 5 or less, or 3 or less.

As is commonly known, the mean squared error is the mean value of the squares of errors and is a qualitative measure of the accuracy of statistical estimation, and it can be said that the lower the MSE, the higher the accuracy of estimation. The mean squared error (MSE) may be calculated by known methods or statistical programs, and for example, the least squares estimator of ellipsometry data may be calculated, and the mean squared error (MSE) may be derived using the calculated least squares estimator.

Meanwhile, according to another embodiment of the invention, an anti-reflective film is provided, which includes: a light transmitting substrate; a hard coating layer formed on the light transmitting substrate; and a low refractive layer formed on the hard coating layer, wherein the low refractive layer includes a first region including a binder resin and high refractive inorganic nanoparticles and having a refractive index of 1.55 or more at a wavelength of 550 nm, and a second region including a binder resin and low refractive inorganic nanoparticles and having a refractive index of 1.45 or less at a wavelength of 550 nm, and when polarization ellipticity measured by ellipsometry is fitted to a Cauchy model of the following Equation 1 for the first region included in the low refractive layer, the requirements that A is 1.50 to 2.00, B is 0 to 0.10, and C is 0 to 0.01 are fulfilled.

$$n(\lambda) = A + \frac{B}{\lambda^2} + \frac{C}{\lambda^4} \quad [\text{Equation 1}]$$

In Equation 1, n(λ) is a refractive index at a λ wavelength, λ is in a range of 300 nm to 1800 nm, and A, B, and C are Cauchy parameters.

Previously, in order to control the reflectance of an anti-reflective film, one or more kinds of fine particles were added, but there was a limit in decreasing the reflectance below a certain level, and there was a problem in that the scratch resistance or anti-fouling property of an anti-reflective film was deteriorated.

Thus, the present inventors progressed studies on an anti-reflective film, confirmed through experiments that if a low refractive layer included in the anti-reflective film includes a binder resin and high refractive inorganic nanoparticles and includes the above-explained first region and second region, and when polarization ellipticity measured by ellipsometry is fitted to a Cauchy model of the following Equation 1, the first region fulfills the requirements that A is 1.50 to 2.00, B is 0 to 0.10, and C is 0 to 0.01, the anti-reflective film may have reflectance of a significantly low level and high transmittance, and simultaneously, realize high scratch resistance and anti-fouling property, and completed the present invention.

Specifically, the first region included in the low refractive layer may fulfill the requirements that A is 1.50 to 2.00, 1.53 to 1.90, or 1.55 to 1.85, B is 0 to 0.10, 0 to or 0 to 0.01, and C is 0 to 0.01, or 0 to 0.005, or 0 to 0.001, and thus, the anti-reflective film of the above embodiment may maintain an optimized refractive index distribution, and simultaneously, realize lower reflectance, and have a structure that is relatively stable against scratches or external pollutants.

Further, when the polarization ellipticity measured by ellipsometry is fitted to a Cauchy model of the above Equation 1 for the second region included in the low refractive layer, the requirements that A is 1.0 to 1.40, 1.10 to 1.40, or 1.20 to 1.40, B is 0 to 0.1, 0 to 0.05, or 0 to 0.01, and C is 0 to 0.01, 0 to 0.005, or 0 to 0.001 may be fulfilled.

The Cauchy parameters A, B, and C of the first region and the second region included in the low refractive layer respectively relate to a refractive index according to wavelength and change in an extinction coefficient, and if the first region fulfills the ranges of the Cauchy parameters A, B, and C as the result of fitting to a Cauchy model of the above Equation 1, the anti-reflective film may maintain optimized electron density and refractive index distribution inside, and thus, realizes reflectance of a significantly low level, and simultaneously has a structure that is relatively stable against scratches or external pollutants.

Specifically, the Cauchy parameter A relates to a refractive index at the maximum wavelength, and B and C relate to the degree of change in a refractive index according to wavelength. Thus, in case each of the first region and the second region included in the low refractive layer fulfill the ranges of the Cauchy parameters A, B, and C as the result of fitting to a Cauchy model of the above Equation 1, the above-explained effects may be further improved and maximized.

The polarization ellipticity measured by ellipsometry and related ellipsometry data (LP, A) may be measured by commonly known methods and devices. More specifically, the polarization ellipticity measured by ellipsometry may determined by applying an incidence angle of 70° and measuring the linear polarization at the wavelength range of 380 nm to 1000 nm.

Hereinafter, the anti-reflective films of the above-explained embodiment(s) will be explained in detail.

In the anti-reflective film of the above explained embodiment(s), the first region and the second region may be distinguished according to a difference in the kind of included particles, a difference in the refractive index of the particles, or a difference in the refractive index of each region.

The three-dimensional shape and cross-sectional shape of the first region and the second region of the low refractive layer are not particularly limited, and for example, the first region and the second region may have a distribution shape wherein the boundary or interface therebetween is not clear, each of the first region and the second region may be a layer having a predetermined thickness, and each of the first region and the second region may be a calculated layer that is confirmed when the polarization ellipticity measured by ellipsometry is fitted to a Cauchy model of Equation 1, instead of a layer that is visually distinguished.

As explained above, since the anti-reflective film of the above explained embodiment(s) fulfills the above-explained specific constructions, it may realize reflectance of a significantly low level, and for example, it may have mean reflectance of 0.6% or less, 0.5% or less, 0.4% or less, or 0.3% or less at the visible light wavelength region of 380 nm to 780 nm. The mean reflectance of the anti-reflective film may be measured after treating the rear side with a dark color.

As explained above, the low refractive layer may include a first region including a binder resin and high refractive inorganic nanoparticles, and a second region including a binder resin and low refractive inorganic nanoparticles.

In case the first region fulfills the requirements that A is 1.5 to 2.00, B is 0 to and C is 0 to 0.01, the second region fulfills the requirements that A is 1.0 to 1.40, B is 0 to 0.10, and C is 0 to 0.01, or a difference between the A value of the first region and the A value of the second region is 0.200 or more, the destructive interference of light reflected at each interface may efficiently occur, thus realizing very low reflectance.

Although the kinds of the high refractive inorganic nanoparticles and the low refractive inorganic nanoparticles are not particularly limited, the high refractive inorganic nanoparticles may have a refractive index of 1.5 or more, or 1.55 or more, and the low refractive inorganic nanoparticles may have a refractive index of 1.45 or less, or 1.40 or less.

Specific examples of the high refractive inorganic nanoparticles may include one or more selected from the group consisting of titanium dioxide ($TiO_2$), diantimony trioxide ($Sb_2O_3$), zirconium dioxide ($ZrO_2$), tin oxide (SnO2), magnesium oxide (MgO), zinc oxide (ZnO), barium titanate (BaTiO3), aluminum oxide ($Al_2O_3$), cerium oxide ($CeO_2$), zirconium titanate, and strontium titanate.

Specific examples of the low refractive inorganic nanoparticles may include one or more selected from the group consisting of magnesium fluoride ($MgF_2$), hollow silica, and mesoporous silica.

Each of the first region and the second region may include 30 to 600 parts by weight of high refractive inorganic nanoparticles and low refractive inorganic nanoparticles, based on 100 parts by weight of the binder resin.

If the content of the inorganic nanoparticles becomes excessive in each of the first region and the second region, two kinds of the particles may be mixed to increase reflectance, and surface unevenness may be excessively generated to deteriorate scratch resistance and anti-fouling property.

The ratio of the average particle diameter of the high refractive inorganic nanoparticles to the average particle diameter of the low refractive inorganic nanoparticles may be 0.008 to 0.55, or 0.05 to 0.5. The present inventors confirmed that in case a difference between the average particle diameters of the two kinds of particles is controlled to the above-explained rate, lower reflectance may be secured in the finally prepared anti-reflective film, and simultaneously, improved scratch resistance and anti-fouling property may be realized.

More specifically, when the ratio of the average particle diameter of the high refractive inorganic nanoparticles to the average particle diameter of the low refractive inorganic nanoparticles in the low refractive layer is 0.008 to 0.55, or 0.05 to 0.5, the high refractive inorganic nanoparticles and the low refractive inorganic nanoparticles may exhibit different existence and distribution aspects in the low refractive layer, and for example, the positions where the high refractive inorganic nanoparticles and the low refractive inorganic nanoparticles are mainly distributed may be at different distances from the interface between the hard coating layer and the low refractive layer.

As explained, since the regions where the high refractive inorganic nanoparticles and the low refractive inorganic nanoparticles are mainly distributed in the low refractive layer are different, the low refractive layer may have a unique internal structure and component arrangement aspect, and thus may have lower reflectance, and the surface property of the low refractive layer may also become different, thereby realizing further improved scratch resistance and anti-fouling property.

The average particle diameter of each the high refractive inorganic nanoparticles and the low refractive inorganic nanoparticles may be an average value obtained by measuring the shortest particle diameter of the high refractive inorganic nanoparticles and the low refractive inorganic nanoparticles confirmed in a TEM photograph (for example, at magnification of 25,000) of the anti-reflective film.

The average particle diameter of the high refractive inorganic nanoparticles may be 1 to 66 nm, or 2 to 55 nm, and the average particle diameter of the low refractive inorganic nanoparticles may be 10 to 120 nm, or 30 to 120 nm, so that the anti-reflective film may have the above-explained properties, for example, lower reflectance and high light transmittance, and simultaneously realize further improved scratch resistance and anti-fouling property.

The high refractive inorganic nanoparticles may have a diameter of 1 nm to 66 nm.

The low refractive inorganic nanoparticles may have a diameter of 10 nm to 120 nm.

The diameters of the high refractive inorganic nanoparticles and the low refractive inorganic nanoparticles may mean the shortest diameters confirmed at the cross-section of the low refractive layer.

Meanwhile, in the anti-reflective film of the above-explained embodiment(s), the first region may be positioned nearer to the interface between the hard coating layer and the low refractive layer, than the second region. More specifically, the first region may contact the interface between the hard coating layer and the low refractive layer, and the second region may be formed on the opposite side.

Since the first region is positioned near the interface between the hard coating layer and the low refractive layer, and the second region is positioned on the opposite side of the interface in the low refractive layer of the anti-reflective film, two or more parts or two or more layers having different refractive indexes may be formed in the low refractive layer, and thus the reflectance of the anti-reflective film may be lowered due to the efficient destructive interference of light reflected at each interface.

As explained above, although the first region and the second region may be distinguished layers in the low refractive layer, they may exist in a continuous phase but may be distinguished into two regions according to the kind of included particles so as to realize lower reflectance. That is, the low refractive layer may be a single layer polymer film including a first region and a second region.

As used herein, a 'single layer polymer film' means a film wherein a single layer of a continuous phase prepared from a coating solution or raw material having a predetermined composition exists, and for example, it also includes a film including sub-layers of a first region and a second region that include the same binder resin and are distinguished by different kinds of particles. The single layer film is distinguished from a multilayer laminate film that is formed by the lamination of multiple films having different compositions or structures.

Further, as explained above, the fact that the first region and the second region exist in the low refractive layer may be visually confirmed. For example, the fact that the first region and the second region exist in the low refractive layer may be visually confirmed using a scanning electron microscope, a transmission electron microscope, and the like.

In the low refractive layer, each of the first region and the second region may have common optical properties in the corresponding region, and thus may be defined as one region. More specifically, each of the first region and the second region may have specific Cauchy parameters A, B, and C when polarization ellipticity measured by ellipsometry is fitted to a Cauchy model of Equation 1, and thus, the first region and the second region may be distinguished from each other. In addition, since the thicknesses of the first region and the second region may also be derived through the fitting of the polarization ellipticity measured by ellipsometry to a Cauchy model of Equation 1, the first region and the second region may also be defined as a layer in the low refractive layer.

Meanwhile, the Cauchy parameters A, B, and C derived through the fitting of the polarization ellipticity measured by ellipsometry to a Cauchy model of Equation 1 may be average values in one region. Thus, if an interface exists between the first region and the second region, a region in which the Cauchy parameters A, B, and C of the first region and the second region are overlapped may exist. However, even in this case, the thicknesses and positions of the regions fulfilling the average values of the Cauchy parameters A, B, and C of the first region and the second region may be specified.

Meanwhile, a method of forming the first region including a binder resin and high refractive inorganic nanoparticles and the second region including a binder resin and low refractive inorganic nanoparticles in the low refractive layer are not particularly limited. For example, a drying temperature, a drying method, a coating method, and the like may be adjusted for a coating solution including high refractive inorganic nanoparticles and low refractive inorganic nanoparticles, and specifically, hot air drying may be used.

Meanwhile, the first region may have a thickness of 20 to 300 nm, 50 to 270 nm, or 60 to 250 nm. Further, the second region may have a thickness of 70 nm to 400 nm, 80 to 300 nm, or 90 to 200 nm.

The thicknesses of the first region and the second region may also be confirmed through the fitting of the polarization ellipticity measured by ellipsometry to a Cauchy model of Equation 1

Meanwhile, the thickness ratio of the first region to the second region may be 0.25 to 4, 0.3 to 3, or 0.4 to 2.5. If the thickness ratio of the second region to the first region is 0.25 to 4, the destructive interference of light reflected at each interface may appropriately occur.

Meanwhile, in the anti-reflective film of the above-explained embodiment(s), the first region and the second region included in the low refractive layer may have different ranges of refractive indexes.

More specifically, the first region included in the low refractive layer may have a refractive index of 1.55 to 2.50, 1.55 to 2.30, 1.55 to 2.10, or 1.55 to 2.00 at 550 nm.

And, the second region included in the low refractive layer may have a refractive index of 1.0 to 1.45, 1.1 to 1.45, or 1.2 to 1.45 at 550 nm.

The refractive index may be measured by commonly known methods, and for example, for each of the first region and the second region included in the low refractive layer, a refractive index at 550 nm may be calculated and determined using elliptical polarization measured at a wavelength of 380 nm to 1000 nm and a Cauchy model.

Since each of the first region and the second region included in the low refractive layer has the above-explained refractive index, the destructive interference of light reflected at each interface may efficiently occur, thereby realizing low reflectance.

Meanwhile, the binder resin included in the low refractive layer may include a crosslinked (co)polymer of a (co)

polymer of photopolymerizable compounds and fluorine-containing compounds including photoreactive functional groups.

Specifically, the photopolymerizable compound may include monomers or oligomers including (meth)acrylate or vinyl groups. More specifically, the photopolymerizable compound may include monomers or oligomers including one or more, two or more, or three or more (meth)acrylate or vinyl groups.

Specific examples of the monomers or oligomers including a (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, ethylene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or mixtures of two or more kinds thereof, or urethane modified acrylate oligomers, epoxide acrylate oligomers, etheracrylate oligomers, dendritic acrylate oligomers, or mixture of two or more kinds thereof. Here, it is preferable that the molecular weight of the oligomer is 1000 to 10,000.

As specific examples of the monomers or oligomers including vinyl groups, divinylbenzene, styrene, and paramethylstyrene may be mentioned.

Meanwhile, the photopolymerizable compound may further include fluorine-based (meth)acrylate-based monomers or oligomers, in addition to the above-explained monomers or oligomers. In case the photopolymerizable compound further includes the fluorine-based (meth)acrylate-based monomers or oligomers, the weight ratio of the fluorine-based (meth)acrylate-based monomers or oligomers to the monomer or oligomers including (meth)acrylate or vinyl groups may be 0.1% to 10%.

Meanwhile, in the low refractive layer, a part derived from the fluorine-containing compound including a photoreactive functional group may be included.

In the fluorine-containing compound including a photoreactive functional group, one or more photoreactive functional groups may be included or substituted, and the photoreactive functional group means a functional group capable of participating in a polymerization reaction by the irradiation of light, for example, irradiation of visible light or UV. The photoreactive functional group may include various functional groups known to be capable of participating in a polymerization reaction by the irradiation of light, and as specific examples thereof, a (meth)acrylate group, an epoxide group, a vinyl group, and a thiol group may be mentioned.

Each fluorine-containing compound including a photoreactive functional group may respectively have a weight average molecular weight (weight average molecular weight in terms of polystyrene measured by GPC) of 2000 to 200,000, preferably 5000 to 100,000.

If the weight average molecular weight of the fluorine-containing compound including a photoreactive functional group is too small, the fluorine-containing compound may not be uniformly and effectively arranged on the surface of the photocurable coating composition and may be positioned inside of the finally prepared low refractive layer, and thus the anti-fouling property of the low refractive layer may be deteriorated and the crosslinking density of the low refractive layer may be lowered, thus deteriorating mechanical properties such as total strength, scratch resistance, etc.

Further, if the weight average molecular weight of the fluorine-containing compounds including a photoreactive functional group is too high, compatibility with other components in the photocurable coating composition may be lowered, and thus haze of the finally prepared low refractive layer may increase or light transmittance may decrease, and the strength of the low refractive layer may also be deteriorated.

Specifically, the fluorine-containing compound including a photoreactive functional group may include one or more selected from the group consisting of: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine and at least one carbon is substituted by silicon; iii) a polydialkyl siloxane-based polymer (for example, a polydimethyl siloxane-based polymer) substituted by one or more photoreactive functional groups, in which at least one silicon is substituted by one or more fluorine atoms; iv) polyether compounds substituted by one or more photoreactive functional groups, in which at least one hydrogen is substituted by fluorine; and mixtures or copolymers of two or more of i) to iv).

The photocurable coating composition may include, based on 100 parts by weight of the photopolymerizable compound, 20 to 300 parts by weight of the fluorine-containing compound including a photoreactive functional group.

If the fluorine-containing compound including a photoreactive functional group is excessively added compared to the photopolymerizable compound, the coatability of the photocurable coating composition may be deteriorated or the low refractive layer obtained from the photocurable coating composition may not have sufficient durability or scratch resistance. Further, if the content of the fluorine-containing compound including a photoreactive functional group is too small compared to the photopolymerizable compound, the low refractive layer obtained from the photocurable coating composition may not have sufficient mechanical properties such as anti-fouling property, scratch resistance, etc.

The fluorine-containing compound including a photoreactive functional group may further include silicon or a silicon-containing compound. That is, the fluorine-containing compound including a photoreactive functional group may optionally contain silicon or a silicon-containing compound, and specifically, the content of silicon in the fluorine-containing compound including a photoreactive functional group may be 0.1 wt % to 20 wt %.

The silicon included in the fluorine-containing compound including a photoreactive functional group may increase compatibility with other components included in the photocurable coating composition, and thus, may prevent the generation of haze in the finally prepared low refractive layer, thereby increasing transparency. Meanwhile, if the content of silicon in the fluorine-containing compound including a photoreactive functional group becomes too high, compatibility of the fluorine-containing compound with other components included in the photocurable coating composition may be rather deteriorated, so the finally prepared low refractive layer or anti-reflective film may not have sufficient light transmittance or anti-reflective performance and the anti-fouling property of the surface may also be deteriorated.

Meanwhile, as the hard coating layer, commonly known hard coating layers may be used without specific limitations.

One example of the hard coating layer may include one including a binder resin including a photocurable resin, and organic or inorganic fine particles dispersed in the binder resin.

The photocurable resin included in the hard coating layer may be a polymer of photocurable compounds capable of inducing a polymerization reaction if light such as UV, etc. is irradiated, that is commonly known in the art. Specifically, the photocurable resin may include one or more selected from the group consisting of: reactive acrylate oligomers such as a urethane acrylate oligomer, an epoxide acrylate oligomer, a polyester acrylate, and a polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol acrylate, propoxylated glycerol triacrylate, tripropylene glycol diacrylate, and ethylene glycol diacrylate.

Although the particle diameter of the organic or inorganic fine particles is not specifically limited, for example, the organic fine particles may have a particle diameter of 1 to 10 µm, and the inorganic fine particles may have a particle diameter of 1 nm to 500 nm, or 1 nm to 300 nm. The particle diameter of the organic or inorganic fine particles may be defined as a volume average particle diameter.

In addition, although specific examples of the organic or inorganic fine particles included in the hard coating layer are not limited, for example, the organic or inorganic fine particles may be organic fine particles selected from the group consisting of an acryl-based resin, a styrene-based resin, an epoxide resin, and a nylon resin, or inorganic fine particles selected from the group consisting of silicon oxide, titanium dioxide, indium oxide, tin oxide, zirconium oxide, and zinc oxide.

The binder resin of the hard coating layer may further include a high molecular weight (co)polymer having a weight average molecular weight of 10,000 or more. The high molecular weight (co)polymer may be one or more selected from the group consisting of a cellulose-based polymer, an acryl-based polymer, a styrene-based polymer, an epoxide-based polymer, a nylon-based polymer, a urethane-based polymer, and a polyolefin-based polymer.

Meanwhile, another example of the hard coating layer may include: a hard coating layer including a binder resin of a photocurable resin; and an antistatic agent dispersed in the binder resin.

The photocurable resin included in the hard coating layer may be a polymer of a photocurable compounds capable of inducing a polymerization reaction by the irradiation of light such as UV, etc., that is commonly known in the art. However, preferably, the photocurable compound may be multifunctional (meth)acrylate-based monomers or oligomers, wherein it is advantageous in terms of securing of the properties of the hard coating layer that the number of (meth)acrylate-based functional groups is 2 to 10, preferably 2 to 8, and more preferably 2 to 7 More preferably, the photocurable compound may be one or more selected from the group consisting of pentaerythritol tri(meth)acrylate, pentaerythritol tetra(meth)acrylate, dipentaerythritol penta (meth)acrylate, dipentaerythritol hexa(meth)acrylate, dipentaerythritol hepta(meth)acrylate, tripentaerythritol hepta(meth)acrylate, thrylene diisocyanate, xylene diisocyanate, hexamethylene diisocyanate, trimethylol propane tri(meth) acrylate, and trimethylol propane polyethoxy tri(meth)acrylate.

The antistatic agent may be: a quaternary ammonium salt compound; pyridinium salt; a cationic compound having 1 to 3 amino groups; an anionic compound such as a sulfonic acid base, a sulfuric ester base, a phosphoric ester base, a phosphonic acid base, etc.; an amphoteric compound such as an amino acid-based or amino sulfuric ester-based compound, etc.; a non-ionic compound such as an imino alcohol-based compound, a glycerin-based compound, a polyethylene glycol-based compound, etc.; an organometal compound such as a metal alkoxide compound containing tin or titanium, etc.; a metal chelate compound such as an acetylacetonate salt of the organometal compound, etc.; reactants or polymerized products of two or more kinds of these compounds; or mixtures of two or more kinds of these compounds. Here, the quaternary ammonium salt compound may be a compound having one or more quaternary ammonium salt groups in the molecule, and a low molecular type or a high molecular type may be used without limitations.

As the antistatic agent, a conductive polymer and metal oxide fine particles may also be used. As the conductive polymer, an aromatic conjugated poly(paraphenylene), a heterocyclic conjugated polypyrrole, a polythiophene, an aliphatic conjugated polyacetylene, a heteroatom-containing conjugated polyaniline, a mixed conjugated poly(phenylene vinylene), a multi-chain type of conjugated compound which is a conjugated compound having multiple conjugated chains in the molecule, a conductive complex in which a conjugated polymer chain is grafted on or block copolymerized with a saturated polymer, etc. may be mentioned. As the metal oxide fine particles, zinc oxide, antimony oxide, tin oxide, cerium oxide, indium tin oxide, indium oxide, aluminum oxide, antimony-doped tin oxide, aluminum-doped zinc oxide, etc. may be mentioned.

The hard coating film including a binder resin of a photocurable resin, and an antistatic agent dispersed in the binder resin, may further include one or more compounds selected from the group consisting of an alkoxy silane-based oligomer and a metal alkoxide-based oligomer.

Although the alkoxy silane-based compound may be one commonly used in the art, preferably, it may include one or more compounds selected form the group consisting of tetramethoxysilane, tetraethoxysilane, tetraisopropoxysilane, methyltrimethoxysilane, methyltriethoxysilane, methacryloxypropyltrimethoxysilane, glycidoxy propyl trimethoxy silane, and glycidoxy propyl triethoxy silane.

The metal alkoxide-based oligomer may be prepared by the sol-gel reaction of a composition including a metal alkoxide-based compound and water. The sol-gel reaction may be conducted by a similar method to the above-explained preparation method of an alkoxy silane-based oligomer.

However, since the metal alkoxide-based compound may rapidly react with water, the sol-gel reaction may be conducted by diluting the metal alkoxide-based compound in an organic solvent, and then slowly dropping water thereto. At this time, considering the reaction efficiency, it is preferable that the mole ratio of the metal alkoxide-based compound to water (based on metal ions) is controlled within a range of 3 to 170.

Here, the metal alkoxide-based compound may be one or more compounds selected from the group consisting of titanium tetra-isopropoxide, zirconium isopropoxide, and aluminum isopropoxide.

The hard coating layer may have a thickness of 0.1 μm to 100 μm.

As explained above, the hard coating layer may be made of materials known to be usable in an anti-reflective film without specific limitations. Specifically, a hard coating layer may be formed by coating a polymer resin composition for forming a hard coating layer on a substrate and photocuring it. The components used for the formation of the hard coating layer are as explained above with regard to the anti-reflective film of one embodiment.

In the step of photocuring the polymer resin composition for forming a hard coating layer, UV or visible rays of a 200400 nm wavelength may be irradiated, and the exposure amount may be preferably 100 to 4,000 mJ/cm$^2$. The exposure time is not specifically limited, and may be appropriately changed according to the exposure apparatus used, the wavelength of irradiated light rays, or an exposure amount. In the step of photocuring the polymer resin composition for forming a hard coating layer, nitrogen purging, etc. may be conducted so as to apply a nitrogen atmosphere condition.

The anti-reflective film of the above embodiment(s) may include a light-transmitting substrate bonded on the other side of the hard coating layer. A specific kind or thickness of the light-transmitting substrate is not particularly limited, and substrates known to be used in the preparation of a low refractive layer or an anti-reflective film may be used without specific limitations.

More specifically, the light-transmitting substrate may be a transparent film having light transmittance of 90% or more and haze of 1% or less.

The light-transmitting substrate may include one or more selected from the group consisting of a cycloolefin polymer film, a poly(meth)acrylate-based film, a polycarbonate film, a triacetyl cellulose (TAO) film, a polynorbornene film, and a polyester film.

The thickness of the light-transmitting layer may be 10 to 300 μm considering productivity and the like, but is not limited thereto.

More specifically, the anti-reflective film may further include a light-transmitting substrate of which thickness direction retardation (Rth), measured at a wavelength of 400 nm to 800 nm, is 3000 nm or more, or 5000 nm or more, or 5000 nm to 20,000 nm. As specific examples of such light-transmitting substrate, a uniaxially drawn polyethylene terephthalate film or a biaxially drawn polyethylene terephthalate film may be mentioned.

If the anti-reflective film includes a light-transmitting substrate of which thickness direction retardation (Rth) measured at a wavelength of 400 nm to 800 nm is 3000 nm or more, 5000 or more, or 5000 to 20,000 nm, compared to using retardation of 3000 nm or less, a rainbow phenomenon by the interference of visible light may be reduced, and light leakage may be reduced in a display apparatus due to a low moisture permeation rate.

The thickness direction retardation (Rth) may be confirmed by a commonly known measuring method and device. For example, as the measuring device of thickness direction retardation (Rth), AxoScan manufactured by AXOMETRICS, Inc. may be mentioned.

For example, the thickness direction retardation (Rth) may be calculated by inputting the refractive index value (589 nm) of the light-transmitting substrate film in the measuring device, and then measuring the thickness direction retardation of the light-transmitting substrate film using light of a 590 nm wavelength under a temperature of 25° C. and humidity of 40%, and converting it into a retardation value per a film thickness of 10 μm, based on the measured value of the thickness direction retardation (value obtained by the automatic measurement (automatic calculation) of the measuring device). The size of the light-transmitting substrate is not specifically limited as long as it is larger than a sidelight part (diameter: about 1 cm) of the stage of the measuring device, but it may have dimensions of a height of 76 cm, a width 52 mm, and a thickness of 13 μm.

Further, the value of ⌈refractive index of the light-transmitting substrate (589 nm)⌋ that is used for the measurement of thickness direction retardation (Rth) may be calculated by forming a non-drawn film including the same kind of a resin film to the light transmitting substrate that forms a film of which retardation is to be measured, and then measuring a refractive index to 589 nm light of the in-plane direction of a measuring sample (a direction perpendicular to the thickness direction), using the non-drawn film as a measuring sample (in case a film to be measured is a non-drawn film, the film itself may be used as a measurement sample), using a refractive measuring apparatus (product name ⌈NAR-1T SOLID⌋ manufactured by Atagoa Co,. Ltd), using a light source of 589 nm, and under a temperature condition of 23° C.

According to another embodiment of the invention, a polarizing plate including the anti-reflective film according to the above embodiment is provided.

The polarizing plate may include a polarizing film and an anti-reflective film formed on at least one side of the polarizing film.

The material and preparation method of the polarizing film are not specifically limited, and those commonly known in the art may be used. For example, the polarizing film may be a polyvinyl alcohol-based polarizing film.

Between the polarizing film and the anti-reflective film, a protection film may be provided.

Although examples of the protection film are not limited, for example, it may be one or more of a COP (cycloolefin polymer)-based film, an acryl-based film, a TAC (triacetyl-cellulose)-based film, a COO (cycloolefin copolymer)-based film, a PNB (polynorbornene)-based film, and a PET (polyethylene terephthalate)-based film.

As the protection film, a substrate for forming a single coating layer when preparing the anti-reflective film may be used as it is.

The polarizing film and the anti-reflective film may be laminated by adhesive such as an aqueous adhesive or a non-aqueous adhesive, and the like.

According to yet another embodiment of the invention, a display apparatus including the above-explained anti-reflective film is provided.

Although specific examples of the display apparatus are not limited, for example, it may be a liquid crystal display, a plasma display apparatus, an organic light emitting diode, and the like.

For example, the display apparatus may be a liquid display apparatus including: one pair of polarizing plates facing each other; a thin film transistor, a color filer, and a liquid crystal cell sequentially stacked between the one pair of polarizing plates; and a backlight unit.

In the display apparatus, the anti-reflective film may be positioned at the side of an observer of a display panel or at the outermost surface of the backlight.

In the display apparatus including the anti-reflective film, an anti-reflective film may be positioned on one side of the polarizing plate relatively distant from the backlight unit, among the one pair of polarizing plates.

Further, the display apparatus may include a display panel, a polarizing film positioned on at least one side of the panel, and an anti-reflective film positioned on the opposite side.

Advantageous Effects

According to the present invention, an anti-reflective film that has high light transmittance, high scratch resistance, and a high anti-fouling property, and simultaneously realizes low reflectance, and thus can increase screen sharpness of a display apparatus, a polarizing plate including the anti-reflective film, and a display apparatus including the anti-reflective film and providing high screen sharpness, may be provided.

DETAILED DESCRIPTION OF THE EMBODIMENTS

The present invention will be explained in detail in the following examples. However, these examples are presented only as the illustrations of the present invention, and the scope of the present invention is not limited thereby.

Preparation Examples

Preparation Example 1: Preparation of a Hard Coating Film (HD1)

A salt-type antistatic hard coating liquid manufactured by KYOEISHA Company (solid content 50 wt %, product name: LJD-1000) was coated on a triacetyl cellulose (TAC) film with #10 Mayer bar and dried at 90° C. for 1 minute, and then irradiated by UV of 150 mJ/cm$^2$ to prepare a hard coating film with a thickness of about 5 μm.

Preparation Example 2: Preparation of a Hard Coating Film (HD2)

30 g of pentaerythritol triacrylate, 2.5 g of a high molecular weight copolymer (BEAMSET 371, Arakawa Co., epoxy acrylate, molecular weight 40,000), 20 g of methyl ethyl ketone, and 0.5 g of a leveling agent (Tego Wet 270) were uniformly mixed, and then 2 g of an acryl-styrene copolymer (volume average particle diameter: 2 μm, manufacturing company: Sekisui Plastics) was added as fine particles having a refractive index of 1.525 to prepare a hard coating composition.

The obtained hard coating composition was coated on a PET film (thickness 80 μm, retardation 10,000 nm) with a #10 Mayer bar, and dried at 90° C. for 1 minute. The dried product was irradiated by UV of 150 mJ/cm$^2$ to prepare a hard coating layer with a thickness of 5 μm.

Examples 1 to 6: Preparation of an Anti-Reflective Film (1) Preparation of a Photocurable Coating Composition for Forming a Low Refractive Layer Example 1

100 parts by weight of pentaerythritol triacrylate (PETA), 190 parts by weight of hollow silica nanoparticles (diameter: about 50 to 60 nm, JSC Catalysts and Chemicals), 572 parts by weight of solid-type $ZrO_2$ particles (diameter: about 16 nm), 73 parts by weight of a fluorine-containing compound (RS-923, DIC Corp.), and 16.2 parts by weight of an initiator (Irgacure 127, Ciba Company) were diluted in methyl isobutyl ketone (MIBK) to a solid concentration of 3 wt %.

Example 2

100 parts by weight of trimethylolpropane trimethacrylate (TMPTA), 97.5 parts by weight of hollow silica nanoparticles (diameter: about 50 to 60 nm, JSC Catalysts and Chemicals), 244 parts by weight of solid-type $ZrO_2$ particles (diameter: about 16 nm), 37.5 parts by weight of a fluorine-containing compound (RS-923, DIC Corp.), and 9.3 parts by weight of an initiator (Irgacure 127, Ciba Company) were diluted in methyl isobutyl ketone (MIBK) to a solid concentration of 3.2 wt %.

Example 3

100 parts by weight of dipentaerythritol hexaacrylate (DPHA), 133 parts by weight of hollow silica nanoparticles (diameter: about 50 to 60 nm, JSC Catalysts and Chemicals), 433 parts by weight of solid-type $TiO_2$ particles (diameter: about 18 nm), 51.3 parts by weight of a fluorine-containing compound (RS-923, DIC Corp.), and 11.3 parts by weight of an initiator (Irgacure 127, Ciba Company) were diluted in methyl isobutyl ketone (MIBK) to a solid concentration of 3.1 wt %.

Example 4

100 parts by weight of pentaerythritol triacrylate (PETA), 190 parts by weight of hollow silica nanoparticles (diameter: about 50 to 60 nm, JSC Catalysts and Chemicals), 590 parts by weight of solid-type $TiO_2$ particles (diameter: about 18 nm), 33.5 parts by weight of a fluorine-containing compound (RS-923, DIC Corp.), and 10 parts by weight of an initiator (Irgacure 127, Ciba Company) were diluted in methyl isobutyl ketone (MIBK) to a solid concentration of 3.3 wt %.

Example 5

100 parts by weight of dipentaerythritol hexaacrylate (DPHA), 185 parts by weight of hollow silica nanoparticles (diameter: about 50 to 60 nm, JSC Catalysts and Chemicals), 244 parts by weight of solid-type $TiO_2$ particles (diameter: about 18 nm), 50 parts by weight of a fluorine-containing compound (RS-923, DIC Corp.), and 9.3 parts by weight of an initiator (Irgacure 127, Ciba Company) were diluted in methyl isobutyl ketone (MIBK) to a solid concentration of 3.2 wt %.

Example 6

100 parts by weight of dipentaerythritol hexaacrylate (DPHA), 155 parts by weight of hollow silica nanoparticles (diameter: about 50 to 60 nm, JSC Catalysts and Chemicals), 220 parts by weight of solid-type $CeO_2$ particles (diameter: about 11 nm), 45.2 parts by weight of a fluorine-containing compound (RS-923, DIC Corp.), and 8.1 parts by weight of an initiator (Irgacure 127, Ciba Company) were diluted in methyl isobutyl ketone (MIBK) to a solid concentration of 3.4 wt %.

(2-1) Preparation of a Low Refractive Layer and an Anti-Reflective Film

On the hard coating layer (HD1) of Preparation Example 1, the above-obtained photocurable coating composition was coated with a #5 Mayer bar to a thickness of about 220 nm, and dried and cured using temperatures and times described in the following Table 1. During the curing, the dried coating was irradiated by UV of 252 mJ/cm² under nitrogen purging.

(2-2) Preparation of a Low Refractive Layer and an Anti-Reflective Film

On the hard coating layer (HD2) of Preparation Example 2, the above-obtained photocurable coating composition was coated with a #5 Mayer bar to a thickness of about 260 nm, and dried and cured using temperatures and times described in the following Table 1. During the curing, the dried coating was irradiated by UV of 252 mJ/cm² under nitrogen purging.

TABLE 1

|  | Drying temperature | Drying time |
|---|---|---|
| Example 1 | 40° C. | 2 minutes |
| Example 2 | 60° C. | 1 minute |
| Example 3 | 80° C. | 1 minute |
| Example 4 | 60° C. | 2 minutes |
| Example 5 | 60° C. | 3 minutes |
| Example 6 | 90° C. | 1 minute |

Comparative Example: Preparation of an Anti-Reflective Film

Comparative Example 1

A photocurable coating composition for forming a low refractive layer was prepared by the same method as Example 1, and an anti-reflective film was prepared by the same method, except for drying at room temperature for 2 minutes.

Comparative Example 2

100 parts by weight of pentaerythritol triacrylate (PETA), 281 parts by weight of hollow silica nanoparticles (diameter: about 50 to 60 nm, JSC Catalysts and Chemicals), 63 parts by weight of solid-type $SiO_2$ particles (diameter: about 12 nm), 150 parts by weight of a fluorine-containing compound (RS-923, DIC Corp.), and 31 parts by weight of an initiator (Irgacure 127, Ciba Company) were diluted in methyl isobutyl ketone (MIBK) to a solid concentration of 3 wt %.

Comparative Example 3

A photocurable coating composition for forming a low refractive layer was prepared by the same method as Example 2, except that the solid-type $ZrO_2$ particles were replaced with 110 nm solid-type $ZnO_2$ particles, and an anti-reflective film was prepared by the same method as Example 2.

Experimental Example: Measurement of the Properties of Anti-Reflective Films

For the anti-reflective films obtained in the examples and comparative examples, the following experiments were conducted.

1. Measurement of Mean Reflectance of an Anti-Reflective Film

The rear sides of the anti-reflective films obtained in the examples and comparative examples were treated with dark colors, and then the mean reflectances at the wavelength region of 380 nm to 780 nm were measured using a reflectance mode of SolidSpec 3700 equipment (SHIMADZU).

2. Measurement of Anti-Fouling Property

On the surface of the anti-reflective films obtained in the examples and comparative examples, straight lines with a length of 5 cm were drawn with a fine black felt pen, and rubbed with a clean wiper, and the number of rubs at which the lines were erased was confirmed to measure the anti-fouling property.

<Measurement Standard>

O: The number of rubs at which the lines are erased is 10 or less

Δ: The number of rubs at which the lines are erased is 11 to 20

X: The number of rubs at which the lines are erased is greater than 20

3. Measurement of Scratch Resistance

The surfaces of the anti-reflective films obtained in the examples and comparative examples were rubbed with a load applied to steel wool (#0000) and reciprocating 10 times at 27 rpm. The maximum load under which one or fewer scratches of 1 cm or less observable by the naked eye was measured.

4. Ellipsometry Measurement

For each low refractive layer obtained in the examples and comparative examples, polarization ellipticity was measured by ellipsometry.

Specifically, for each low refractive layer obtained in the examples and comparative examples, using an apparatus of J. A. Woollam Co., M-2000, a 70° incidence angle was applied and linear polarization was measured at a wavelength range of 380 nm to 1000 nm. The measured ellipsometry data (LP, A) were fitted to a Cauchy model of the following Equation 1 for Layer 1 and Layer 2 of the low refractive layer such that a mean squared error (MSE) is 3 or less, using Complete EASE software.

$$n(\lambda) = A + \frac{B}{\lambda^2} + \frac{C}{\lambda^4} \quad [\text{Equation 1}]$$

In Equation 1, n(λ) is a refractive index at a λ wavelength, λ is a range of 300 nm to 1800 nm, and A, B, and C are Cauchy parameters.

5. Measurement of Refractive Index

For each of the first region and the second region included in the low refractive layers obtained in the examples, the refractive index at 550 nm was calculated using elliptic polarization at a wavelength of 380 nm to 1000 nm and a Cauchy model.

TABLE 2

|  | Example 1 | Example 2 | Example 3 | Example 4 | Example 5 |
|---|---|---|---|---|---|
| Mean reflectance (%) | 0.18 | 0.24 | 0.17 | 0.19 | 0.20 |
| Scratch resistance (g) | 200 | 200 | 200 | 200 | 200 |
| Anti-fouling property | O | O | O | O | O |

TABLE 2-continued

| | | | | | | |
|---|---|---|---|---|---|---|
| Whether or not phase is separated | | ◯ | ◯ | ◯ | ◯ | ◯ |
| | | | Ellipsometry measurement | | | |
| Layer. 1 | A | 1.626 | 1.601 | 1.651 | 1.615 | 1.591 |
| | B | 0.000 | 0.0025 | 0.00135 | 0.000513 | 0.00331 |
| | C | 0.00023579 | 0.00013547 | 0.00002542 | 0.00008462 | 0.00006413 |
| Layer. 2 | A | 1.252 | 1.261 | 1.302 | 1.266 | 1.293 |
| | B | 0.00221 | 0.000 | 0.00199 | 0.00642 | 0.00243 |
| | C | 0.00059387 | 0.00021465 | 0.0001325 | 0.0004643 | 0.0007411 |
| Difference in A values | | 0.374 | 0.340 | 0.349 | 0.349 | 0.298 |

| | | Example 6 | Comparative Example 1 | Comparative Example 2 | Comparative Example 3 |
|---|---|---|---|---|---|
| Mean reflectance (%) | | 0.4 | 1.3 | 0.68 | 1.2 |
| Scratch resistance (g) | | 200 | 200 | 500 | 200 |
| Anti-fouling property | | ◯ | Δ | ◯ | Δ |
| Whether or not phase is separated | | ◯ | X | ◯ | X |
| | | Ellipsometry measurement | | | |
| Layer. 1 | A | 1.585 | 1.552 | 1.503 | .575 |
| | B | 0.00841 | 0.000134 | 0.00315 | 0.000216 |
| | C | 0.00005113 | 0.00009522 | 0.00041850 | 0.00006452 |
| Layer. 2 | A | 1.361 | 1.555 | 1.35 | .577 |
| | B | 0.00364 | 0.003494 | 0.00512 | 0.0003843 |
| | C | 0.0000513 | 0.0003164 | 0.0003347 | 0.0002164 |
| Difference in A values | | 0.224 | 0.003 | 0.153 | 0.002 |

TABLE 3

| | Example 1 | Example 2 | Example 3 | Example 4 | Example 5 | Example 6 |
|---|---|---|---|---|---|---|
| Layer 1 | 1.65 | 1.63 | 1.7 | 1.63 | 1.61 | 1.60 |
| Layer 2 | 1.30 | 1.29 | 1.31 | 1.30 | 1.30 | 1.38 |

As confirmed in Table 2, when the polarization ellipticity measured by ellipsometry was fitted to a Cauchy model of Equation 1 for the second region included in the low refractive layer, the requirements that A is 1.0 to 1.40, B is 0 to 0.10, and C is 0 to 0.01 were fulfilled, and when the polarization ellipticity measured by ellipsometry was fitted to a Cauchy model of Equation 1 for the first region included in the low refractive layer, the requirements that A is 1.50 to 2.00, B is 0 to and C is 0 to 0.01 were fulfilled.

Further, as shown in Table 2, it was confirmed that the anti-reflective films of the examples exhibit low reflectance of 0.50% or less at the visible light region, and simultaneously, realize high scratch resistance and anti-fouling property. In addition, as shown in Table 3, it was confirmed that the first regions and the second regions included in the low refractive layers of the examples exhibited different ranges of refractive indexes, and specifically, the first regions of the low refractive layers exhibit refractive indexes of 1.55 or more, and the second regions of the low refractive layers exhibit refractive indexes of 1.45 or less.

It was also confirmed that when polarization ellipticity measured by ellipsometry was fitted to a Cauchy model of Equation 1, the anti-reflective films of Comparative Examples 1 to 3 exhibit measurement results and Cauchy model fitting results of different ranges from the anti-reflective films of the examples, and exhibit relatively high reflectance and have low scratch resistance and anti-fouling property.

Particularly, it was confirmed that the anti-reflective films of the examples realize mean reflectance of 0.4% or less, while the anti-reflective films of Comparative Examples 1 and 3 exhibit mean reflectance of 1.2% or 1.3%, and the anti-reflective film of Comparative Example 2 exhibits mean reflectance of 0.68%, and thus the anti-reflective films of the examples can realize significantly lowered mean reflectance.

What is claimed is:

1. An anti-reflective film with a mean reflectance of 0.6% or less in the visible light wavelength region of 380 nm to 780 nm comprising:
   a light transmitting substrate;
   a hard coating layer formed on the light transmitting substrate; and
   a low refractive index layer formed on the hard coating layer,
   wherein the low refractive index layer comprises a first region comprising a binder resin and high refractive index inorganic nanoparticles, and a second region comprising the binder resin and low refractive index inorganic nanoparticles,
   wherein the low refractive index inorganic nanoparticles comprise low refractive index inorganic nanoparticles that are hollow, mesoporous, or a combination thereof, and a ratio of an average particle diameter of the high refractive index inorganic nanoparticles to an average particle diameter of the low refractive index inorganic nanoparticles is 0.008 to 0.55,
   wherein the first region of the low refractive index layer is positioned in contact with an interface between the hard coating layer and the low refractive index layer, and the second region of the low refractive index layer is positioned on the opposite side of the first region relative to the interface,
   wherein the first region and the second region have an interface comprising the high refractive index inorganic nanoparticles and the low refractive index inorganic nanoparticles,
   wherein each of the first region and the second region of the low refractive index layer has polarization ellipticity measured by ellipsometry using a Cauchy model represented by Equation 1 below, in which a difference between an A value of the first region and an A value of the second region is at least 0.200, the A value of the second region is 1.0 to 1.40, each of B values of the first and second regions is 0 to 0.1, and each of C values of the first and second regions is 0 to 0.01, wherein the first and second regions are optical regions that are distinguished from each other as determined by the polarization ellipticity measured by ellipsometry using the Cauchy model represented by Equation 1, and wherein the second region of the low refractive layer has a refractive index of 1.45 or less at 550 nm, and the first region of the low refractive layer has a refractive index of at least 1.55 at 550 nm:

$$n(\lambda) = A + \frac{B}{\lambda^2} + \frac{C}{\lambda^4} \quad [\text{Equation 1}]$$

wherein, in the Equation 1, n(λ) is a refractive index at a λ, wavelength, λ, is in a range of 300 nm to 1800 nm, and A, B, and C are Cauchy parameters.

2. The anti-reflective film according to claim 1, wherein, the A value of the first region is 1.50 to 2.00.

3. The anti-reflective film according to claim 1, wherein the anti-reflective film has reflectance of 0.4% or less in the visible light wavelength region of 380 nm to 780 nm.

4. The anti-reflective film according to claim 1, wherein the first region has a thickness of 20 nm to 300 nm, and the second region has a thickness of 70 nm to 400 nm.

5. The anti-reflective film according to claim 1, wherein the high refractive index inorganic nanoparticles include one or more selected from the group consisting of titanium dioxide ($TiO_2$), diantimony trioxide ($Sb_2O_3$), zirconium dioxide ($ZrO_2$), tin oxide (SnO2), magnesium oxide (MgO), zinc oxide (ZnO), barium titanate ($BaTiO_3$), aluminum oxide ($Al_2O_3$), cerium oxide ($CeO_2$), zirconium titanate, and strontium titanate, and the low refractive index inorganic nanoparticles include one or more selected from the group consisting of hollow silica and mesoporous silica.

6. The anti-reflective film according to claim 1, wherein the first region comprises 70 vol % or more of the high refractive index inorganic nanoparticles, and the second region comprises 70 vol % or more of the low refractive index inorganic nanoparticles.

7. The anti-reflective film according to claim 1, wherein the binder resin in the first region and the second region comprises a crosslinked (co)polymer of a (co)polymer of photopolymerizable compounds and fluorine-containing compounds comprising photoreactive functional groups.

8. The anti-reflective film according to claim 1, wherein the second region of the low refractive layer has a refractive index of 1.0 to 1.45 at 550 nm, and the first region of the low refractive layer has a refractive index of 1.55 to 2.50 at 550 nm.

9. The anti-reflective film according to claim 1, wherein the hard coating layer comprises a binder resin comprising a photocurable resin and organic or inorganic fine particles dispersed in the binder resin.

10. The anti-reflective film according to claim 9, wherein the organic fine particles have a particle diameter of 1 to 10 μm, and the inorganic fine particles have a particle diameter of 1 nm to 500 nm.

11. The anti-reflective film according to claim 1, wherein the light-transmitting substrate includes one or more selected from the group consisting of a cycloolefin polymer film, a poly(meth)acrylate-based film, a polycarbonate film, a triacetyl cellulose (TAC) film, a polynorbornene film, and a polyester film.

12. The anti-reflective film according to claim 1, wherein the light-transmitting substrate is a polyethylene terephthalate film having a thickness direction retardation (Rth) of at least 3000 nm at a wavelength of 400 nm to 800 nm.

13. A polarizing film comprising the anti-reflective film of claim 1.

14. A display apparatus comprising the anti-reflective film of claim 1.

15. The anti-reflective film according to claim 1, wherein the low refractive index inorganic nanoparticles further comprise magnesium fluoride ($MgF_2$).

16. An anti-reflective film with a mean reflectance of 0.6% or less in the visible light wavelength region of 380 nm to 780 nm comprising:

a light transmitting substrate;

a hard coating layer formed on the light transmitting substrate; and a low refractive index layer formed on the hard coating layer, wherein the low refractive index layer comprises a first region comprising a binder resin and high refractive index inorganic-nanoparticles, and a second region comprising the binder resin and low refractive index inorganic nanoparticles, wherein the low refractive index inorganic nanoparticles comprise low refractive index inorganic nanoparticles that are hollow, mesoporous, or a combination thereof, and a ratio of an average particle diameter of the high refractive index inorganic nanoparticles to an average particle diameter of the low refractive index inorganic nanoparticles is 0.008 to 0.55, wherein the first region of the low refractive index layer is positioned in contact with an interface between the hard coating layer and the low refractive index layer, and the second region of the low refractive index layer is positioned on the opposite side of the first region relative to the interface, wherein the first region and the second region have an interface comprising the high refractive index inorganic nanoparticles and the low refractive index inorganic nanoparticles, and wherein each of the first region and the second region of the low refractive index layer has polarization ellipticity measured by ellipsometry using a Cauchy model represented by Equation 1 below, in which a difference between an A value of the first region and an A value of the second region is at least 0.200, the A value of the first region is 1.50 to 2.00, each of B values of the first and second regions is 0 to 0.10, and each of C values of the first and second regions is 0 to 0.01, and wherein the first and second regions are optical regions that are distinguished from each other as determined by the polarization ellipticity measured by ellipsometry using the Cauchy model represented by Equation 1, and wherein the second region of the low refractive layer has a refractive index of 1.45 or less at 550 nm, and the first region of the low refractive layer has a refractive index of at least 1.55 at 550 nm:

$$n(\lambda) = A + \frac{B}{\lambda^2} + \frac{C}{\lambda^4} \qquad \text{[Equation 1]}$$

wherein, in the Equation 1, n(κ) is a refractive index at a λ, wavelength, λ, is in a range of 300 nm to 1800 nm, and A, B, and C are Cauchy parameters.

17. The anti-reflective film according to claim 16, wherein the A value of the second region is 1.0 to 1.40.

18. The anti-reflective film according to claim 16, wherein the anti-reflective film has reflectance of 0.4% or less in the visible light wavelength region of 380 nm to 780 nm.

19. The anti-reflective film according to claim 16, wherein the first region has a thickness of 20 nm to 300 nm, and the second region has a thickness of 70 nm to 400 nm.

20. The anti-reflective film according to claim 16, wherein the low refractive index inorganic nanoparticles further comprise magnesium fluoride ($MgF_2$).

* * * * *